US012604289B2

(12) United States Patent
Lin

(10) Patent No.: US 12,604,289 B2
(45) Date of Patent: Apr. 14, 2026

(54) METHOD AND APPARATUS FOR TIMING ADVANCE

(71) Applicant: Telefonaktiebolaget LM Ericsson (publ), Stockholm (SE)

(72) Inventor: Zhipeng Lin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 343 days.

(21) Appl. No.: 18/272,605

(22) PCT Filed: Jan. 17, 2022

(86) PCT No.: PCT/CN2022/072324
§ 371 (c)(1),
(2) Date: Jul. 17, 2023

(87) PCT Pub. No.: WO2022/152297
PCT Pub. Date: Jul. 21, 2022

(65) Prior Publication Data
US 2024/0080784 A1 Mar. 7, 2024

(30) Foreign Application Priority Data

Jan. 18, 2021 (WO) ............... PCT/CN2021/072500

(51) Int. Cl.
*H04W 56/00* (2009.01)
*H04W 72/231* (2023.01)
(Continued)

(52) U.S. Cl.
CPC ..... *H04W 56/0045* (2013.01); *H04W 72/231* (2023.01); *H04W 74/0833* (2013.01); *H04W 74/0836* (2024.01); *H04W 74/0838* (2024.01)

(58) Field of Classification Search
CPC ........... H04W 56/0045; H04W 72/231; H04W 74/0838; H04W 74/0836; H04W 74/0833
See application file for complete search history.

(56) References Cited

U.S. PATENT DOCUMENTS 11,800,477 B2 * 10/2023 Jiang ................. H04W 56/0045
2012/0300715 A1 * 11/2012 Pelletier ........... H04W 74/0891
370/329

(Continued)

FOREIGN PATENT DOCUMENTS

CN         109769295 A  *  5/2019
WO     WO-2019191988 A1 * 10/2019  ............ H04W 74/08
WO         2020218894 A1   10/2020

OTHER PUBLICATIONS

Author Unknown, "Technical Specification Group Radio Access Network; Physical layer procedures for shared spectrum channel access (Release 16)," Technical Specification 37.213, Version 16.4.0, Dec. 2020, 3GPP Organizational Partners, 26 pages.

(Continued)

*Primary Examiner* — Jael M Ulysse
(74) *Attorney, Agent, or Firm* — Withrow & Terranova, PLLC

(57) ABSTRACT

Embodiments of the present disclosure provide methods, apparatus, and computer program products for timing advance. A method in a wireless device, comprises: determining if a timing advance command received in a media access control (MAC) control element is an absolute timing advance command; and when it is determined that the timing advance command is an absolute timing advance command, determining a timing advance based on all bits of the timing advance command.

14 Claims, 11 Drawing Sheets

(51) Int. Cl.
| | |
|---|---|
| *H04W 74/0833* | (2024.01) |
| *H04W 74/0836* | (2024.01) |
| *H04W 74/0838* | (2024.01) |

(56) References Cited

U.S. PATENT DOCUMENTS

| | | | | |
|---|---|---|---|---|
| 2012/0300752 | A1* | 11/2012 | Kwon | H04W 56/001 370/336 |
| 2012/0314652 | A1* | 12/2012 | Ahn | H04W 56/0045 370/328 |
| 2013/0201910 | A1* | 8/2013 | Bergstrom | H04L 5/001 370/328 |
| 2013/0272235 | A1* | 10/2013 | Tseng | H04W 72/23 370/329 |
| 2014/0086219 | A1* | 3/2014 | Suzuki | H04W 56/0005 370/336 |
| 2015/0230194 | A1* | 8/2015 | Yang | H04L 5/0051 370/337 |
| 2018/0084546 | A1* | 3/2018 | Guo | H04W 72/0446 |
| 2018/0124724 | A1 | 5/2018 | Tsai et al. | |
| 2019/0191399 | A1* | 6/2019 | Islam | H04W 56/005 |
| 2019/0215861 | A1* | 7/2019 | Son | H04L 5/001 |
| 2019/0254064 | A1* | 8/2019 | Islam | H04W 56/001 |
| 2019/0335515 | A1* | 10/2019 | Chen | H04W 76/18 |
| 2020/0260445 | A1* | 8/2020 | Jeong | H04W 72/23 |
| 2020/0322908 | A1* | 10/2020 | Prakash | H04W 56/004 |
| 2020/0329504 | A1* | 10/2020 | Kunt | H04W 74/0836 |
| 2020/0344812 | A1* | 10/2020 | Agiwal | H04L 1/1848 |
| 2020/0351949 | A1* | 11/2020 | Turtinen | H04W 74/0891 |
| 2020/0396709 | A1* | 12/2020 | Sun | H04W 56/001 |
| 2020/0396734 | A1* | 12/2020 | Li | H04W 56/0005 |
| 2021/0007146 | A1 | 1/2021 | Agiwal et al. | |
| 2021/0058885 | A1* | 2/2021 | Shao | H04W 56/0045 |
| 2021/0105828 | A1* | 4/2021 | Agiwal | H04L 5/0051 |
| 2021/0153193 | A1* | 5/2021 | Lin | G04R 20/02 |
| 2021/0195546 | A1* | 6/2021 | Lei | H04W 80/02 |
| 2021/0227585 | A1* | 7/2021 | Tsai | H04W 74/0833 |
| 2021/0274525 | A1* | 9/2021 | Wei | H04W 76/27 |
| 2021/0321355 | A1* | 10/2021 | Gao | H04W 56/0045 |
| 2021/0329580 | A1* | 10/2021 | Kim | H04W 56/0015 |
| 2021/0345279 | A1* | 11/2021 | Ying | H04W 56/0055 |
| 2021/0360556 | A1* | 11/2021 | Liu | H04W 56/005 |
| 2021/0392601 | A1* | 12/2021 | Takeda | H04W 74/006 |
| 2022/0124795 | A1* | 4/2022 | Wu | H04W 56/0045 |
| 2022/0124825 | A1* | 4/2022 | Shi | H04W 74/0836 |
| 2022/0159598 | A1* | 5/2022 | Kim | H04W 56/001 |
| 2022/0183079 | A1* | 6/2022 | Ouchi | H04W 74/006 |
| 2022/0279585 | A1* | 9/2022 | Jang | H04W 74/0833 |
| 2022/0394758 | A1* | 12/2022 | Turtinen | H04W 74/002 |
| 2023/0397141 | A1* | 12/2023 | El Kolli | H04W 56/0045 |
| 2024/0188112 | A1* | 6/2024 | Dinan | H04W 72/52 |
| 2024/0292468 | A1* | 8/2024 | Xu | H04B 7/18563 |
| 2025/0016034 | A1* | 1/2025 | Dinan | H04L 5/0035 |

OTHER PUBLICATIONS

Author Unknown, "Technical Specification Group Radio Access Network; NR; Physical channels and modulation (Release 16)," Technical Specification 38.211, Version 16.4.0, Dec. 2020, 3GPP Organizational Partners, 133 pages.

Author Unknown, "Technical Specification Group Radio Access Network; NR; Physical layer procedures for control (Release 16)," Technical Specification 38.213, Version 16.4.0, Dec. 2020, 3GPP Organizational Partners, 181 pages.

Author Unknown, "Technical Specification Group Radio Access Network; NR; Medium Access Control (MAC) protocol specification (Release 16)," Technical Specification 38.321, Version 16.3.0, Dec. 2020, 3GPP Organizational Partners, 156 pages.

Ericsson, "R1-2101526: Draft CR to 38.213 on corrections for 2-step RACH," 3GPP TSG RAN WG1 #104-e, Jan. 25-Feb. 5, 2021, Electronic Meeting, 2 pages.

International Search Report and Written Opinion for International Patent Application No. PCT/CN2022/072324, mailed Apr. 13, 2022, 11 pages.

Extended European Search Report for European Patent Application No. 22739172.9, mailed Jun. 14, 2024, 8 pages.

* cited by examiner

UE                                    gNB

A          Random Access Preamble
           PUSCH payload

Contention Resolution          B

| TAG ID | Timing Advance Command | Oct 1 |

| R | R | R | R | Timing Advance Command | Oct 1 |
|---|---|---|---|---|---|
| Timing Advance Command | | | | | Oct 2 |

700

710

Determine if a timing advance command received in MAC control element is an absolute timing advance command

720

Determine a timing advance based on all bits of the timing advance command, when it is determined that the timing advance command is an absolute timing advance command

BEGIN

1010
Host computer provides user data

1011
Host computer executes host application

1020
Host computer initiates transmission carrying the user data to the UE

1030
Base station transmits the user data

1040
UE executes client application

END

METHOD AND APPARATUS FOR TIMING ADVANCE

This application is a 35 U.S.C. § 371 national phase filing of International Application No. PCT/CN2022/072324, filed Jan. 17, 2022, which claims the benefit of International Application No. PCT/CN2021/072500, filed Jan. 18, 2021, the disclosures of which are incorporated herein by reference in their entireties.

TECHNICAL FIELD

The non-limiting and exemplary embodiments of the present disclosure generally relate to the technical field of wireless communication, and specifically to methods, apparatuses and computer programs for timing advance.

BACKGROUND

This section introduces aspects that may facilitate a better understanding of the disclosure. Accordingly, the statements of this section are to be read in this light and are not to be understood as admissions about what is in the prior art or what is not in the prior art.

In order to preserve the orthogonality in the uplink (UL), the UL transmissions from multiple user equipments (UEs) need to be time aligned at a network node, such as a base station, a gNB or the like. This means that the transmission timing of the UEs in the same cell should be adjusted to ensure that their signals arrive at the gNB receiver at the same time. In order to perform this adjustment, Timing Advance (TA) is defined to specify the advance of the uplink frame relative to the downlink (DL) frame.

A timing advance for a particular UE is calculated by the network node according to an uplink signal sent by the UE, and then notified to the UE through a timing advance command (TAC). The UE parses the TA from the timing advance command, thereby determining the amount of timing advance it needs for its uplink frame. Currently, the parsing of TA from a timing advance command is relatively simple and needs further improvement.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Various embodiments of the present disclosure mainly aim at providing methods, apparatuses and computer programs for improving a parsing of TA form a timing advance command. Other features and advantages of embodiments of the present disclosure will also be understood from the following description of specific embodiments when read in conjunction with the accompanying drawings, which illustrate, by way of example, the principles of embodiments of the present disclosure.

In a first aspect of the present disclosure, there is provided a method in a wireless device. The method comprises: determining if a timing advance command received in a media access control (MAC) control element is an absolute timing advance command; and determining, when it is determined that the timing advance command is an absolute timing advance command, a timing advance based on all bits of the timing advance command.

In some embodiments, a size of the timing advance command may be 12 bits.

In some embodiments, determining the timing advance based on all bits of the timing advance command may comprise: determining the timing advance based on 12 bits of the timing advance command in a same way as a timing advance command signaled in a random access response (RAR).

In some embodiments, determining a timing advance based on all bits of the timing advance command may comprise: determining a first timing advance from 7 most significant bits in 12 bits of the timing advance command; determining a second timing advance from 5 least significant bits in the 12 bits of the timing advance command; and determining the timing advance in a same way as a normal timing advance command, by taking the first timing advance as an old timing advance and taking the second timing advance as an adjustment of timing advance. In some embodiments, the first timing advance may be calculated as a value of the 7 most significant bits multiplied with 32; and the second timing advance may be calculated as a value of the 5 least significant bits plus 31. The normal timing advance command may be a timing advance command received in a timing advance command MAC control element.

In some embodiments, determining if the timing advance command received in the MAC control element is an absolute timing advance command may comprise: determining if the timing advance command received in the MAC control element is an absolute timing advance command according to a logical identifier of the timing advance command.

In some embodiments, the method may further comprise: receiving the timing advance command from a network node, in an absolute timing advance command MAC control element.

In some embodiments, the method may further comprise: applying the determined timing advance in an uplink communication from the wireless communication device to a network node.

In some embodiments, the wireless communication device may comprise a user equipment, UE.

In a second aspect of the present disclosure, there is provided an apparatus. The apparatus may comprise a processor and a memory coupled to the processor. The memory may contain instructions executable by the processor, whereby the apparatus is operative to perform any step of the method according to the first aspect of the disclosure In a third aspect of the present disclosure, there is provided a computer-readable medium having computer program codes embodied thereon which, when executed on a computer, cause the computer to perform any step of the method according to the first aspect of the present disclosure.

According to the various aspects and embodiments as mentioned above, it can make sure that the uplink timing is synchronized, and the expected timing advance is applied for the wireless device when an absolute timing advance command is transmitted to the wireless device in a downlink shared channel. Otherwise, for example, if only 6 out of the 12 bits of an absolute timing advance command are treated and applied to an uplink transmission by a UE, after it receives the absolute timing advance command in a downlink shared channel, the uplink timing will not be synchronized with uplink transmissions from other UEs on the network side, which will cause interference from each other and the failure of decoding the uplink transmissions from the UE.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figures 1, 2:
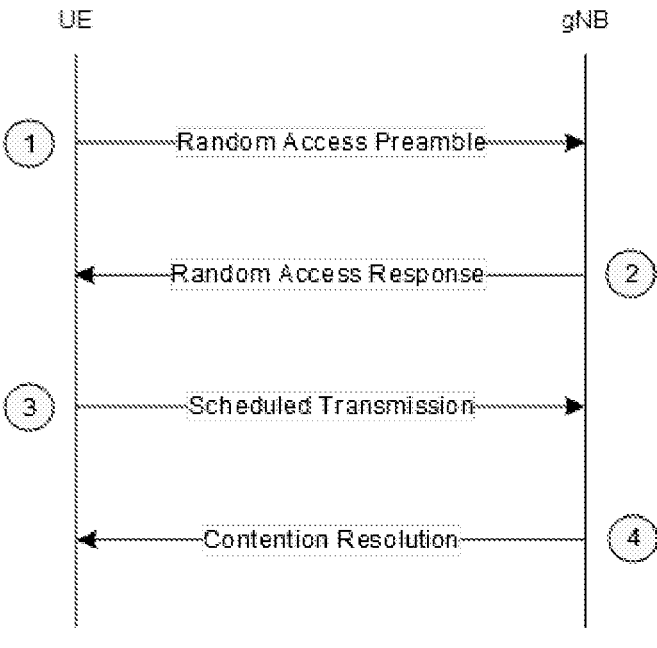
FIG. 1 illustrates an example of a four-step random access procedure for an initial access.
FIG. 2 illustrates an example of a two-step random access procedure for initial access.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "wireless device" refers to any device that can access a communication network and receive services therefrom via a wireless link. By way of example and not limitation, the wireless device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a wireless device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the wireless device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

In the following description and claims, unless defined otherwise, all technical and scientific terms used herein have the same meaning as commonly understood by one of ordinary skills in the art to which this disclosure belongs. For example, the term "wireless device" used herein may refer to any wireless device or user equipment (UE) having wireless communication capabilities, including but not limited to, mobile phones, cellular phones, smart phones, or personal digital assistants (PDAs), portable computers, image capture devices such as digital cameras, gaming devices, music storage and playback appliances, wearable devices, vehicle-mounted wireless device and the like. In the following description, the terms "wireless device", "user equipment" and "UE" may be used interchangeably. Similarly, the term "network node" may represent any network functionality in a 5G network.

This disclosure focuses on schemes for parsing timing advance from a timing advance command. In New Radio (NR), a gNB is responsible for maintaining the timing advance to keep the Layer 1 synchronised in uplink. Serving cells having uplink to which a same timing advance applies and using a same timing reference cell are grouped in a timing advance group (TAG). Each TAG contains at least one serving cell with configured uplink, and the mapping of each serving cell to a TAG is configured via radio resource control (RRC).

For a primary TAG, a UE uses the PCell as a timing reference, except with shared spectrum channel access where an SCell can also be used in certain cases. In a secondary TAG, a UE may use any of the activated SCells of this TAG as a timing reference cell, but should not change it unless necessary.

A gNB sends a timing advance command to a UE in two ways. During the random access procedure, the gNB determines the timing advance value by measuring the received preamble, and sends it to the UE through the Timing Advance Command field (12 bits in total, corresponding to the TA index value range of 0-3846) of a RAR. After the random access procedure, the gNB needs to maintain timing advance information. The gNB determines a timing advance value of each UE based on measuring the uplink transmission of the corresponding UE. If a specific UE needs to be corrected, the eNodeB will send a Timing Advance Command to the UE, requesting it to adjust the uplink transmission timing.

Two types of random access procedure are supported: 4-step random access type with Msg 1 and 2-step random access type with Msg A. Both types of random access procedure support contention-based random access (CBRA) and contention-free random access (CFRA). A UE selects the type of random access at initiation of the random access procedure based on network configuration:

when CFRA resources are not configured, an RSRP (Reference Signal Receiving Power) threshold is used by the UE to select between 2-step random access type and 4-step random access type;

when CFRA resources for 4-step random access type are configured, the UE performs random access with 4-step random access type;

when CFRA resources for 2-step random access type are configured, the UE performs random access with 2-step random access type.

The network does not configure CFRA resources for 4-step and 2-step RA types at the same time for a Bandwidth Part (BW P). CFRA with 2-step RA type is only supported for handover.

A four-step random access procedure for an initial access is illustrated in FIG. 1.

For an initial access, a UE initiates the random-access procedure by transmitting in uplink a random access preamble (Msg 1) on a physical random-access channel (PRACH). After detecting the Msg1, the gNB will respond by transmitting in downlink a random-access response (RAR) on a PDSCH (Msg2). In the third step, after successfully decoding Msg2, the UE continues the procedure by transmitting a message for terminal identification and RRC connection establishment request (Msg3), in uplink, e.g., in a physical uplink shared channel (PUSCH). In the last step of the procedure, the gNB transmits a message for contention resolution (Msg4) in downlink, e.g., in a physical downlink shared channel (PDSCH).

Figure 3:
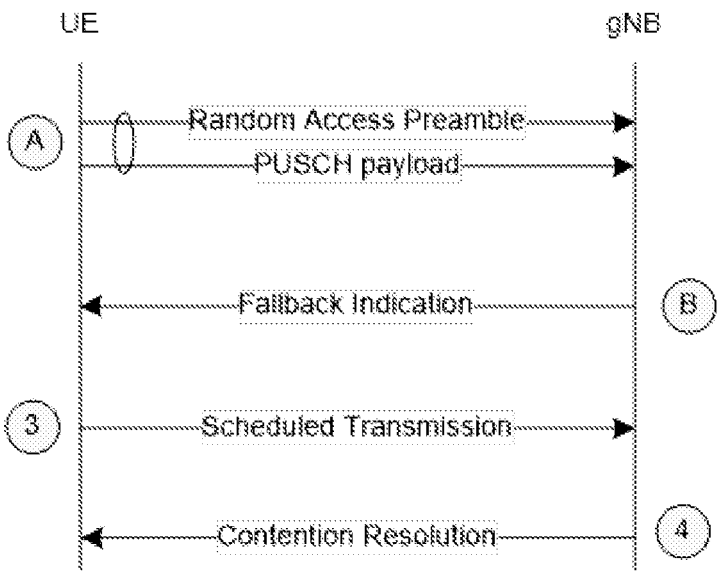
FIG. 3 illustrates another example of a two-step random access procedure for initial access.

An exemplary 2-step random access procedure, also referred to as Type-2 random access procedure in TS 38.213, is illustrated in FIG. 2. In the first step, a UE sends a message A (also called Msg A) including a random access preamble, together with higher layer data, such as RRC connection request possibly with some small payload on PUSCH. After detecting the Msg A, the gNB sends a RAR (also called Msg B) including UE identifier assignment, timing advance information, and contention resolution message etc. When a Msg A on a PUSCH is failed to be decoded, a fallback procedure may be used from 2-step RACH to 4-step RACH, as is illustrated in FIG. 3.

Figure 4A:
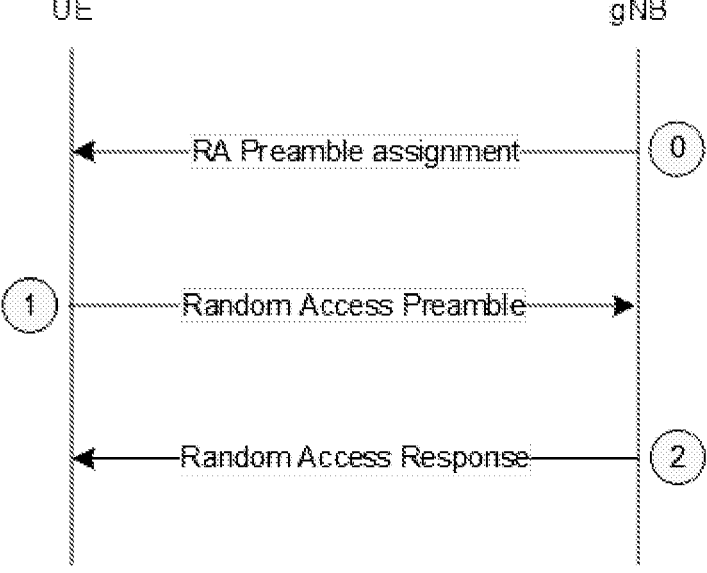
FIGS. 4A and 4B illustrate examples of contention-free random access procedures.

For CFRA with 4-step random access type, the gNB allocates specific random access resources to a UE, through RA (random access) assignment as shown in FIG. 4(A). In this regard, a dedicated preamble for Msg 1 transmission is assigned by the gNB. Through the dedicated random access preamble, the network can identify a specific UE. Upon receiving a random access response from the gNB, the UE ends the random access procedure as shown in FIG. 4A.

Figures 4B, 5:
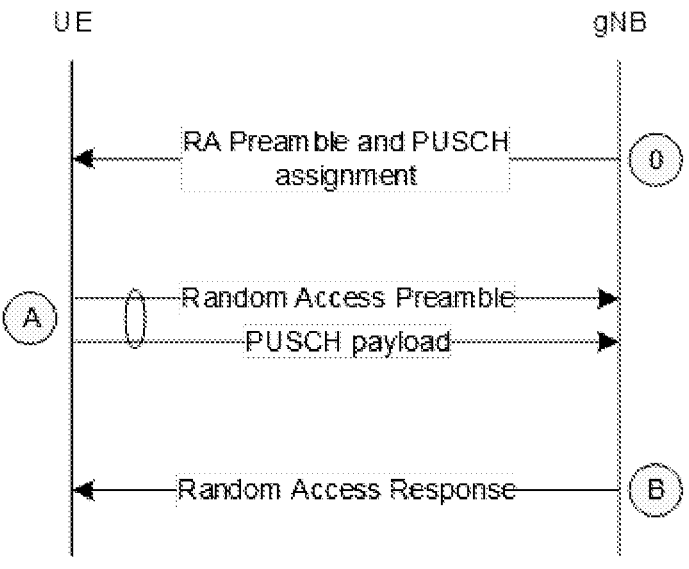
FIG. 5 illustrates an exemplary format of timing advance command MAC (media access control) CE (control element)

For CFRA with 2-step random access type, a dedicated preamble and PUSCH resources are configured for Msg A transmission by the gNB. Upon receiving a random access response from the gNB, the UE ends the random access procedure as shown in FIG. 4B.

There are three types of random access response (RAR) that can be used to carry timing advance command, including MAC RAR in 4-step random access procedure and fallback RAR or success RAR in 2-step random access procedure. The MAC RAR is of a fixed size, and consists of the following fields:

R: Reserved bit, set to "0";

Timing Advance Command: The Timing Advance Command field indicates the index value TA used to control the amount of timing adjustment that the MAC entity has to apply, e.g. in TS 38.213. The size of the Timing Advance Command field is 12 bits;

UL Grant: The Uplink Grant field indicates the resources to be used on the uplink, e.g. in TS 38.213. The size of the UL Grant field is 27 bits;

Temporary C-RNTI: The Temporary C-RNTI field indicates the temporary identity that is used by the MAC entity during Random Access. The size of the Temporary C-RNTI field is 16 bits.

The fallback RAR is sent to a UE in a Msg B in a fallback from 2-step random access to 4-step random access, e.g., as shown in FIG. 3. The fallback RAR is of fixed size as depicted, and consists of the following fields:

R: Reserved bit, set to "0";

Timing Advance Command: The Timing Advance Command field indicates the index value TA used to control the amount of timing adjustment that the MAC entity has to apply in TS 38.213. The size of the Timing Advance Command field is 12 bits;

UL Grant: The Uplink Grant field indicates the resources to be used on the uplink in TS 38.213. The size of the UL Grant field is 27 bits;

Temporary C-RNTI: The Temporary C-RNTI field indicates the temporary identity that is used by the MAC entity during Random Access. The size of the Temporary C-RNTI field is 16 bits.

The success RAR is sent to a UE in a Msg B in a successful 2-step random access, e.g., as shown in FIG. 2. The success RAR is of fixed size as depicted, and consists of the following fields:

UE Contention Resolution Identity: This field contains the UL CCCH SDU. If the UL CCCH SDU is longer than 48 bits, this field contains the first 48 bits of the UL CCCH SDU.

R: Reserved bit, set to "0";

ChannelAccess-CPext: The channel access type and CP extension for the PUCCH resource containing the HARQ feedback for MSGB in shared spectrum channel access, e.g., as specified in TS 38.213. The field is only present when the MSGB HARQ feedback is to be transmitted with shared spectrum channel access, e.g. as specified in TS 37.213. Otherwise, the field is not present and R bits are present instead. The size of the ChannelAccess-CPext field is 2 bits;

TPC: The TPC command for the PUCCH resource containing HARQ feedback for MSGB, as specified in TS 38.213. The size of the TPC field is 2 bits;

HARQ Feedback Timing Indicator: The PDSCH-to-HARQ feedback timing indicator field for MSGB HARQ feedback, e.g., as specified in TS 38.213. The size of the HARQ Feedback Timing Indicator field is 3 bits;

PUCCH Resource Indicator: The PUCCH resource indicator for HARQ feedback for MSGB, e.g., as specified in TS 38.213. The size of the PUCCH resource Indicator field is 4 bits;

Timing Advance Command: The Timing Advance Command field indicates the index value TA used to control the amount of timing adjustment that the MAC entity has to apply, e.g., in TS 38.213. The size of the Timing Advance Command field is 12 bits;

C-RNTI: The C-RNTI field indicates the identity that is used by the MAC entity upon completion of Random Access. The size of the C-RNTI field is 16 bits.

When applying the TA command in a random access response, a timing advance command (denoted as $T_A$), for a TAG indicates $N_{TA}$ values by an index value of $T_A$=0, 1, 2, . . . , 3846, where an amount of the time alignment for the TAG with a sub-carrier space (SCS) of $2^\mu \cdot 15$ kHz is $N_{TA}=T_A \cdot 16 \cdot 64/2^\mu$. $N_{TA}$ is relative to the SCS of the first uplink transmission from the UE after the reception of the random access response. $N_{TA}$ is defined in TS 38.211, for example.

Although in the random access procedure, a UE and a gNB have achieved uplink synchronization, the timing of the uplink signal reaching the gNB may change over time.

For example, for a UE in a high-speed movement, such as a UE on a train running in a high-speed, a transmission delay between the UE and the gNB will continue to change. Therefore, the UE needs to continuously update its timing advance to maintain uplink synchronization.

Timing advance updates are signalled by a gNB to a UE through a Timing Advance Command MAC CE command. Such commands restart a TAG-specific timer which indicates whether the Layer 1 can be synchronised or not. In this regard, when the timer is running, it is considered that the Layer 1 is synchronised, otherwise, it is considered that the Layer 1 is non-synchronised (in which case uplink transmission can only take place on physical random access channel).

The Timing Advance Command MAC CE is identified by MAC subheader with a logic channel identity (LCID), e.g. as specified in TS 38.321 V6.3.0. It has a fixed size and consists of a single octet defined as shown in FIG. 5. A field of TAG Identity (TAG ID) indicates the TAG Identity of the addressed TAG. The TAG containing the SpCell (special Cell) has the TAG Identity 0. As shown in FIG. 5, the length of the field TAG ID is 2 bits. A field of timing advance command indicates the index value of $T_A$ (=0, 1, 2 . . . 63) used to control the amount of timing adjustment that MAC entity has to apply (as specified in TS 38.213 V6.4.0). As shown in FIG. 5, the length of the field is 6 bits. In this disclosure, this kind of timing advance command of 6 bits is referred to as a normal timing advance command, with compared to an absolute timing advance command which will be introduced later.

The normal timing advance command is used to adjust the uplink timing advance in a closed-loop mechanism. In this mechanism, the timing advance is maintained based on an old timing advance and a new timing advance, wherein the new timing advance is a timing advance to be applied for a current uplink transmission, and the old timing advance is a timing advance applied for last uplink transmission. The new timing advance is the old timing advance plus a timing advance adjustment received from a current normal timing advance command. In this regard, a timing advance command $T_A$, for a TAG indicates an adjustment of a current $N_{TA}$ value (denoted as $N_{TA\_old}$), to the new $N_{TA}$ value (denoted as $N_{TA\_new}$), by index values of $T_A$=0, 1, 2, . . . , 63, where for a SCS of $2^\mu \cdot 15$ kHz, $N_{TA\_new}=N_{TA\_old}+(T_A-31) \cdot 16 \cdot 64/2^\mu$.

In some cases, the closed-loop mechanism may be restarted. For example, in an RRC (Radio Resource Control) connected state, the old timing advance may be unusable due to a high-speed movement of a UE. An absolute timing advance command is signaled by a gNB to the UE via a MAC CE. The Absolute Timing Advance Command MAC CE can be used to carry a 12 bits timing advance. It is received in a DL-SCH (Downlink Shared Channel) with a logic channel ID for absolute timing advance command. For example, it can be received in a PDSCH addressed by C-RNTI (Cell-Radio Network Temporary Identifier) in 2-step random access procedure. In 2-step random access procedure, when the PDSCH is addressed by C-RNTI, the massage received in PDSCH in response to Msg A is not called RAR, it's a message in DL-SCH, although it's still transmitted in the 2-step random access procedure. The following table illustrate an exemplary LCID definition for the Absolute Timing Advance Command MAC CE.

TABLE 62.1-1b

| in TS 38.321 V16.3.0 Values of one-octet eLCID for DL-SCH | | |
|---|---|---|
| Codepoint | Index | LCID values |
| 0 to 244 | 64 to 308 | Reserved |
| 245 | 309 | Serving Cell Set based SRS Spatial Relation Indication |
| 246 | 310 | PUSCH Pathloss Reference RS Update |
| 247 | 311 | SRS Pathloss Reference RS Update |
| 248 | 312 | Enhanced SP/AP SRS Spatial Relation Indication |
| 249 | 313 | Enhanced PUCCH Spatial Relation Activation/Deactivation |
| 250 | 314 | Enhanced TCI States Activation/Deactivation for UE-specific PDSCH |
| 251 | 315 | Duplication RLC Activation/Deactivation |
| 252 | 316 | Absolute Timing Advance Command |
| 253 | 317 | SP Positioning SRS Activation/Deactivation |
| 254 | 318 | Provided Guard Symbols |
| 255 | 319 | Timing Delta |

Figure 6:
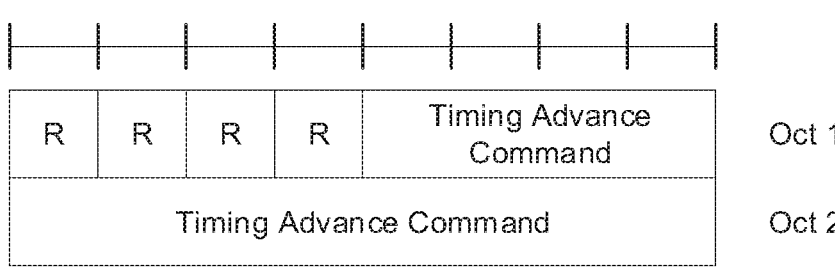
FIG. 6 illustrates an exemplary format of absolute timing advance command MAC CE.

The Absolute Timing Advance Command MAC CE has a fixed size and consists of two octets defined as shown in FIG. 6. A field of timing advance command indicates the index value $T_A$ used to control the amount of timing adjustment that the MAC entity has to apply, e.g. in TS 38.213 V16.4.0. The size of the field is 12 bits. A field of R is filled with reserved bits, which are set to "0".

According to current specification, when applying the timing advance command, only the timing advance command in a random access response is treated as 12 bits timing advance, while all other cases are treated as 6 bits timing advance. This will make the uplink timing to be wrong when only 6 bits in a timing advance command of 12 bits in absolute timing advance command MAC CE are used. The present disclosure provides solutions for solving this problem.

Figure 7:
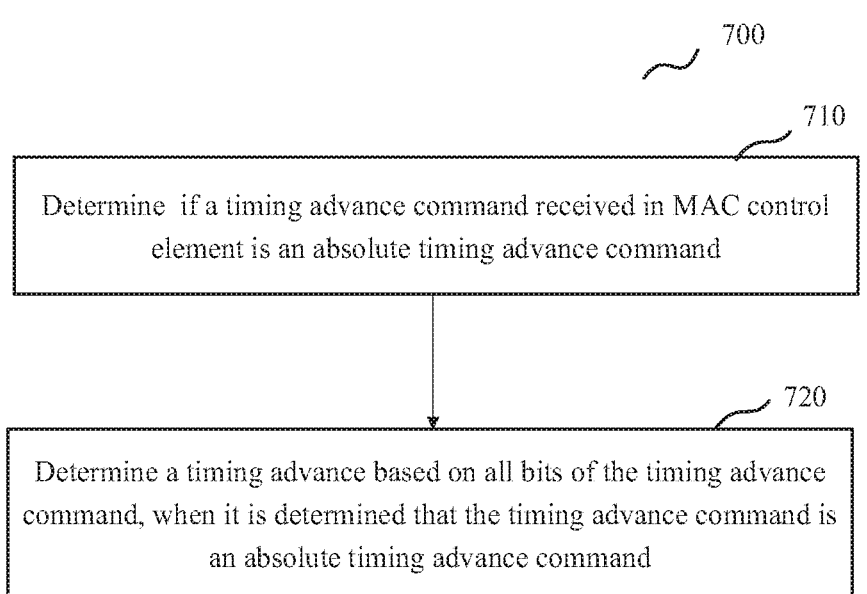
FIG. 7 illustrate a flowchart of a method according to some embodiments of the present disclosure.

FIG. 7 illustrates a flowchart of a method 700 for timing advance at a wireless device (e.g., UE), according to some embodiments of the present disclosure. As shown in FIG. 7, the method 700 comprises determining if a timing advance command received in a MAC control element is an absolute timing advance command, at block 710. When it is determined that the timing advance command is an absolute timing advance command, the method 700 proceeds to determine a timing advance based on all bits of the timing advance command, as shown at block 720.

Although not shown in FIG. 7, the method 700 may further comprise: receiving the timing advance command from a network node, in an absolute timing advance command MAC control element.

Although not shown in FIG. 7, the method 700 may further comprise: applying the determined timing advance in an uplink communication from the wireless communication device to a network node.

As discussed above, the size of the absolute timing advance command is longer than a normal timing advance command. For example, the size of absolute timing advance command is 12 bits, while the size of the normal timing advance command is 6 bits. Through a special parsing of the absolute timing advance command in a MAC control element, the uplink timing would not be wrong from the absolute timing advance command.

In an embodiment, determining the timing advance based on all bits of the timing advance command comprises:

determining the timing advance based on 12 bits of the timing advance command in a same way as a timing advance command signaled in a random access response (RAR). In this regard, the timing advance command carried in an absolute timing advance command MAC control element are treated as 12 bits in the same way as the timing advance command signaled in a RAR.

As an example, a UE can be configured to parse a timing advance command as follows:

in case of a random access response or absolute timing advance command MAC control element, a timing advance command (denoted as $T_A$), for a TAG indicates $N_{TA}$ values by an index value of $T_A$=0, 1, 2, . . . , 3846, where an amount of the time alignment for the TAG with a sub-carrier space (SCS) of $2^\mu \cdot 15$ kHz is $N_{TA}=T_A \cdot 16 \cdot 64/2^\mu$. $N_{TA}$ is relative to the SCS of the first uplink transmission from the UE after the reception of the random access response. $N_{TA}$ is defined in TS 38.211, for example.

in other cases, a timing advance command $T_A$, for a TAG indicates an adjustment of a current $N_{TA}$ value (denoted as $N_{TA\_old}$), to the new $N_{TA}$ value (denoted as $N_{TA\_new}$), by index values of $T_A$=0, 1, 2, . . . , 63, where for a SCS of $2^\mu \cdot 15$ kHz, $N_{TA\_new}=N_{TA\_old}+(T_A-31) \cdot 16 \cdot 64/2^\mu$.

In another embodiment, the timing advance command carried in Absolute Timing Advance Command MAC CE are treated in at least 2 parts. In an example, the timing advance command of 12 bits is divided into two parts, in which one part is the 7 most significant bits of the 12 bits, and another part is 5 least significant bits of the 12 bits. Then, determining a timing advance based on all bits of the timing advance command comprises: determining a first timing advance from the 7 most significant bits, and determining a second timing advance from the 5 least significant bits. Then, a timing advance to be applied for a current uplink transmission can be determined in a same way as a normal timing advance command. In this regard, the first timing advance is taken as an old timing advance, and the second timing advance taken as a normal timing advance, i.e. an adjustment to the old timing advance.

As an example, for a 12 bits absolution timing advance command (with an index value denoted as $TA_{abs}$), its 7 most significant bits, with a value denoted as $TA_{high}$, are treated as an old timing advance with an index value of $TA_{old}$ divided by 32 (i.e., $2^5$). That is, $TA_{old}=TA_{high}*32$. Its 5 least significant bits, with a value denoted as $TA_{low}$, plus 31 are treated as a normal timing advance command of 6 bits, with an index value of TA. That is, $TA=TA_{low}+31$. Then, the new timing advance $TA_{new}$ can then be derived in a same way as a normal 6-bit timing advance command. That is, $TA_{new}=TA_{old}+(TA-31)$.

From a deduction: $TA_{new}=TA_{old}+(TA-31)=TA_{high}*32+TA_{low}+31-31=TA_{high}*32+TA_{low}=TA_{abs}$, it can be determined that the new timing advance is correct. It should be noted that in this example, the new timing advance and the old timing advance are calculated as index values of $N_{TA}$. The amount of the current time alignment $N_{TA\_old}$ and the amount of the new time alignment $N_{TA\_new}$ can be derived from $TA_{old}$ and $TA_{new}$ in combination with the sub-carrier space.

This invention provides methods to correct the uplink timing of timing advance, when an absolute timing advance command is received in an absolute timing advance command MAC control element, so that the uplink timing will be accurate after the timing adjustment based on this absolute timing advance command.

It is noted that some embodiments of the present disclosure are mainly described in relation to 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does not limit the present disclosure naturally in any way. Rather, any other system configuration or radio technologies may equally be utilized as long as exemplary embodiments described herein are applicable.

Figure 8:
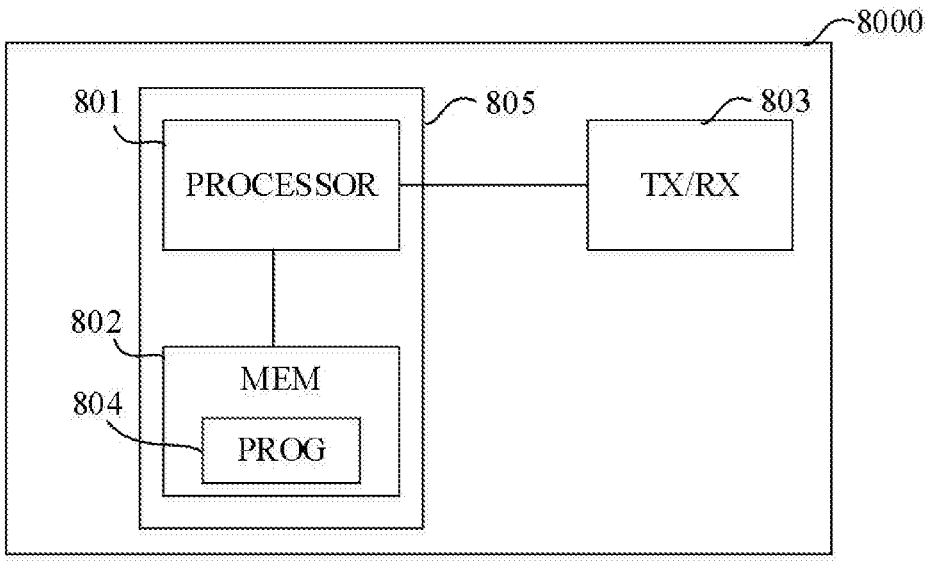
FIG. 8 is a block diagram illustrating an apparatus according to some embodiments of the present disclosure.

FIG. 8 illustrates a simplified block diagram of an apparatus 8000 that may be embodied in/as a terminal device (e.g., a UE), or a network node (e.g., a gNB). The apparatus 8000 may comprise at least one processor 801, such as a data processor (DP) and at least one memory (MEM) 802 coupled to the processor 801. The apparatus 8000 may further comprise a transmitter TX and receiver RX 803 coupled to the processor 801. The MEM 802 stores a program (PROG) 804. The PROG 804 may include instructions that, when executed on the associated processor 801, enable the apparatus 8000 to operate in accordance with the embodiments of the present disclosure, for example to perform the method 700. A combination of the at least one processor 801 and the at least one MEM 802 may form processing means 805 adapted to implement various embodiments of the present disclosure.

Various embodiments of the present disclosure may be implemented by computer program executable by one or more of the processors 801, software, firmware, hardware or in a combination thereof.

The MEMs 802 may be of any type suitable to the local technical environment and may be implemented using any suitable data storage technology, such as semiconductor based memory devices, magnetic memory devices and systems, optical memory devices and systems, fixed memory and removable memory, as non-limiting examples.

The processors 801 may be of any type suitable to the local technical environment, and may include one or more of general purpose computers, special purpose computers, microprocessors, digital signal processors DSPs and processors based on multicore processor architecture, as non-limiting examples.

Figure 9:
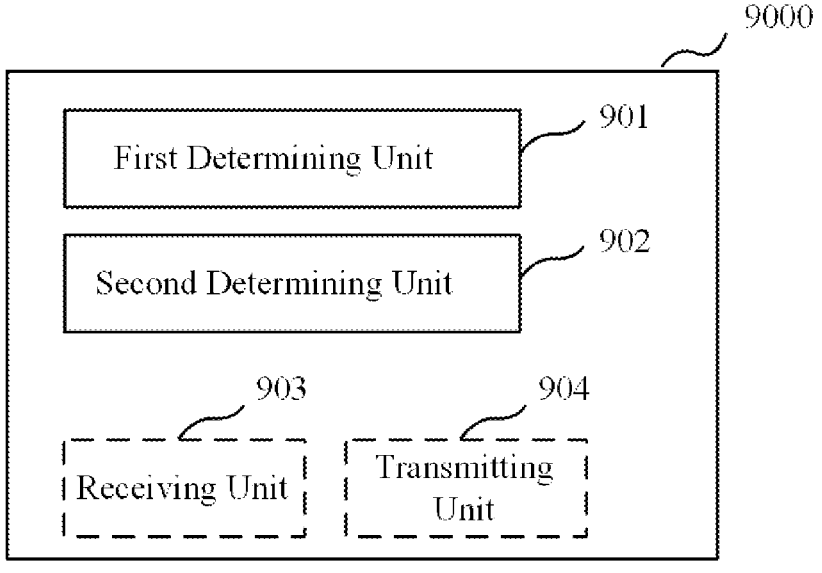
FIG. 9 is a block diagram illustrating apparatus according to some embodiments of the present disclosure.

Reference is now made to FIG. 9, which illustrates a schematic block diagram of apparatus 9000 in a terminal device, such as a UE. The apparatus 9000 is operable to carry out the exemplary method 700 described with reference to FIG. 7, and possibly any other processes or methods.

As shown in FIG. 9, the apparatus 9000 may comprise: a first determining unit 901, which is configured to determine if a timing advance command received in a media access control (MAC) control element is an absolute timing advance command. The apparatus 9000 further comprises a second determining unit 902, which is configured to determine a timing advance based on all bits of the timing advance command, when it is determined that the timing advance command is an absolute timing advance command.

In some embodiments, the apparatus 9000 may further comprise a receiving unit 903, which is configured to receive the timing advance command from a network node, in an absolute timing advance command MAC control element.

Figure 10:
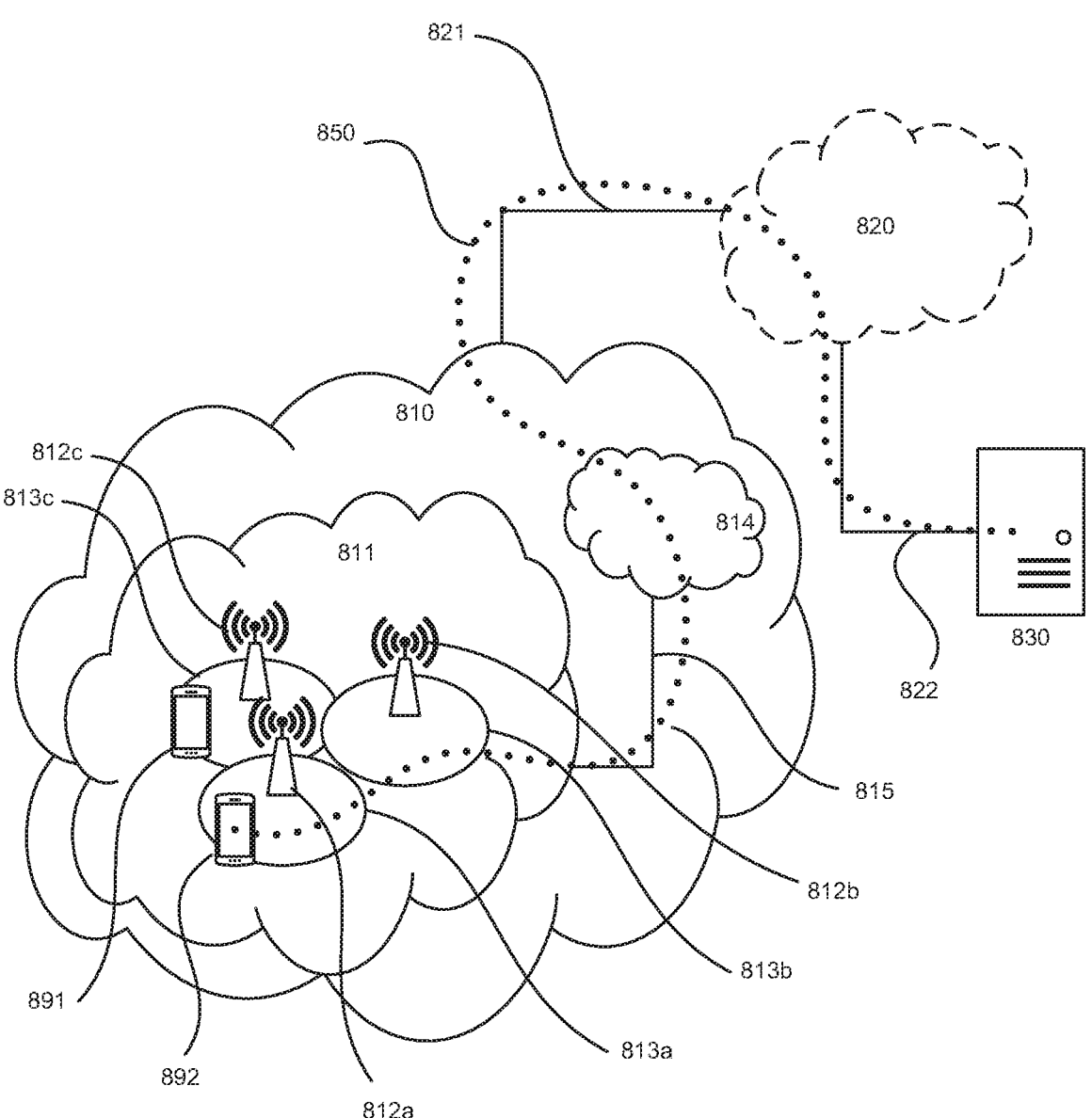
FIG. 10 is a block diagram illustrating a telecommunication network connected via an intermediate network to a host computer in accordance with some embodiments of the present disclosure.

In some embodiments, the apparatus 9000 may further comprise a transmitting unit 904, which is configured to apply the determined timing advance in an uplink communication from the wireless communication device to a network node FIG. 10 is a block diagram illustrating a telecommunication network connected via an intermediate network to a host computer in accordance with some embodiments of the present disclosure.

With reference to FIG. 10, in accordance with an embodiment, a communication system includes a telecommunication network 810, such as a 3GPP-type cellular network, which comprises an access network 811, such as a radio access network, and a core network 814. The access network 811 comprises a plurality of base stations 812a, 812b, 812c, such as NBs, eNBs, gNBs or other types of wireless access points, each defining a corresponding coverage area 813a, 813b, 813c. Each base station 812a, 812b, 812c is connectable to the core network 814 over a wired or wireless connection 815. A first UE 891 located in a coverage area 813c is configured to wirelessly connect to, or be paged by, the corresponding base station 812c. A second UE 892 in a coverage area 813a is wirelessly connectable to the corresponding base station 812a. While a plurality of UEs 891, 892 are illustrated in this example, the disclosed embodiments are equally applicable to a situation where a sole UE is in the coverage area or where a sole UE is connecting to the corresponding base station 812.

The telecommunication network 810 is itself connected to a host computer 830, which may be embodied in the hardware and/or software of a standalone server, a cloud-implemented server, a distributed server or as processing resources in a server farm. The host computer 830 may be under the ownership or control of a service provider, or may be operated by the service provider or on behalf of the service provider. Connections 821 and 822 between the telecommunication network 810 and the host computer 830 may extend directly from the core network 814 to the host computer 830 or may go via an optional intermediate network 820. An intermediate network 820 may be one of, or a combination of more than one of, a public, private or hosted network; the intermediate network 820, if any, may be a backbone network or the Internet; in particular, the intermediate network 820 may comprise two or more sub-networks (not shown).

The communication system of FIG. 10 as a whole enables connectivity between the connected UEs 891, 892 and the host computer 830. The connectivity may be described as an over-the-top (OTT) connection 850. The host computer 830 and the connected UEs 891, 892 are configured to communicate data and/or signaling via the OTT connection 850, using the access network 811, the core network 814, any intermediate network 820 and possible further infrastructure (not shown) as intermediaries. The OTT connection 850 may be transparent in the sense that the participating communication devices through which the OTT connection 850 passes are unaware of routing of uplink and downlink communications. For example, the base station 812 may not or need not be informed about the past routing of an incoming downlink communication with data originating from the host computer 830 to be forwarded (e.g., handed over) to a connected UE 891. Similarly, the base station 812 need not be aware of the future routing of an outgoing uplink communication originating from the UE 891 towards the host computer 830.

Figure 11:
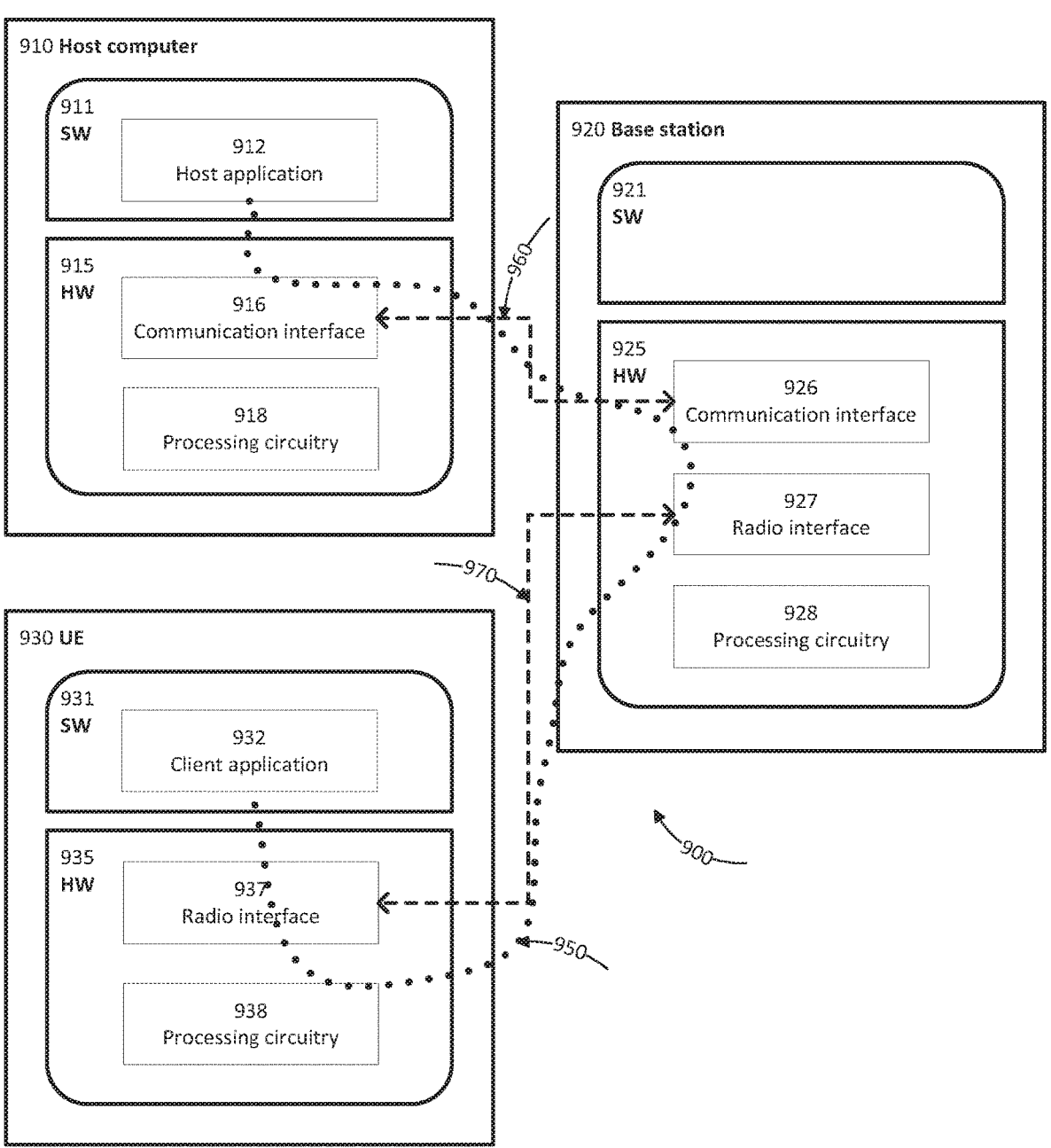
FIG. 11 is a block diagram illustrating a host computer communicating via a base station with a UE over a partially wireless connection in accordance with some embodiments of the present disclosure.

FIG. 11 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 11. In a communication system 900, a host computer 910 comprises hardware 915 including a communication interface 916 configured to set up and maintain a wired or wireless connection with an interface of a different communication device of the communication system 900. The host computer 910 further comprises a processing circuitry 918, which may have storage and/or processing capabilities. In particular, the processing circuitry 918 may comprise one or more programmable processors, application-specific integrated circuits, field programmable gate arrays or combinations of these (not shown) adapted to execute instructions. The host computer 910 further comprises software 911, which is stored in or accessible by the host computer 910 and executable by the processing circuitry 918. The software 911 includes a host application 912. The host application 912 may be operable to provide a service to a remote user, such as UE 930 connecting via an OTT connection 950 terminating at the UE 930 and the host computer 910. In providing the service to the remote user, the host application 912 may provide user data which is transmitted using the OTT connection 950.

The communication system 900 further includes a base station 920 provided in a telecommunication system and comprising hardware 925 enabling it to communicate with the host computer 910 and with the UE 930. The hardware 925 may include a communication interface 926 for setting up and maintaining a wired or wireless connection with an interface of a different communication device of the communication system 900, as well as a radio interface 927 for setting up and maintaining at least a wireless connection 970 with the UE 930 located in a coverage area (not shown in FIG. 11) served by the base station 920. The communication interface 926 may be configured to facilitate a connection 960 to the host computer 910. The connection 960 may be direct or it may pass through a core network (not shown in FIG. 11) of the telecommunication system and/or through one or more intermediate networks outside the telecommunication system. In the embodiment shown, the hardware 925 of the base station 920 further includes a processing circuitry 928, which may comprise one or more programmable processors, application-specific integrated circuits, field programmable gate arrays or combinations of these (not shown) adapted to execute instructions. The base station 920 further has software 921 stored internally or accessible via an external connection.

The communication system 900 further includes the UE 930 already referred to. Its hardware 935 may include a radio interface 937 configured to set up and maintain a wireless connection 970 with a base station serving a coverage area in which the UE 930 is currently located. The hardware 935 of the UE 930 further includes a processing circuitry 938, which may comprise one or more programmable processors, application-specific integrated circuits, field programmable gate arrays or combinations of these (not shown) adapted to execute instructions. The UE 930 further comprises software 931, which is stored in or accessible by the UE 930 and executable by the processing circuitry 938. The software 931 includes a client application 932. The client application 932 may be operable to provide a service to a human or non-human user via the UE 930, with the support of the host computer 910. In the host computer 910, an executing host application 912 may communicate with the executing client application 932 via the OTT connection 950 terminating at the UE 930 and the host computer 910. In providing the service to the user, the client application 932 may receive request data from the host application 912 and provide user data in response to the request data. The OTT connection 950 may transfer both the request data and the user data. The client application 932 may interact with the user to generate the user data that it provides.

It is noted that the host computer 910, the base station 920 and the UE 930 illustrated in FIG. 11 may be similar or identical to the host computer 830, one of base stations 812a, 812b, 812c and one of UEs 891, 892 of FIG. 10, respectively. This is to say, the inner workings of these entities may be as shown in FIG. 11 and independently, the surrounding network topology may be that of FIG. 10.

In FIG. 11, the OTT connection 950 has been drawn abstractly to illustrate the communication between the host computer 910 and the UE 930 via the base station 920, without explicit reference to any intermediary devices and the precise routing of messages via these devices. Network infrastructure may determine the routing, which it may be configured to hide from the UE 930 or from the service provider operating the host computer 910, or both. While the OTT connection 950 is active, the network infrastructure may further take decisions by which it dynamically changes the routing (e.g., on the basis of load balancing consideration or reconfiguration of the network).

Wireless connection 970 between the UE 930 and the base station 920 is in accordance with the teachings of the embodiments described throughout this disclosure. One or more of the various embodiments improve the performance of OTT services provided to the UE 930 using the OTT connection 950, in which the wireless connection 970 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 950 between the host computer 910 and the UE 930, in response to variations in the measurement results. The measurement procedure and/or the network functionality for reconfiguring the OTT connection 950 may be implemented in software 911 and hardware 915 of the host computer 910 or in software 931 and hardware 935 of the UE 930, or both. In embodiments, sensors (not shown) may be deployed in or in association with communication devices through which the OTT connection 950 passes; the sensors may participate in the measurement procedure by supplying values of the monitored quantities exemplified above, or supplying values of other physical quantities from which the software 911, 931 may compute or estimate the monitored quantities. The reconfiguring of the OTT connection 950 may include message format, retransmission settings, preferred routing etc.; the reconfiguring need not affect the base station 920, and it may be unknown or imperceptible to the base station 920. Such procedures and functionalities may be known and practiced in the art. In certain embodiments, measurements may involve proprietary UE signaling facilitating the host computer 910's measurements of throughput, propagation times, latency and the like. The measurements may be implemented in that the software 911 and 931 causes messages to be transmitted, in particular empty or 'dummy' messages, using the OTT connection 950 while it monitors propagation times, errors etc.

Figure 12:
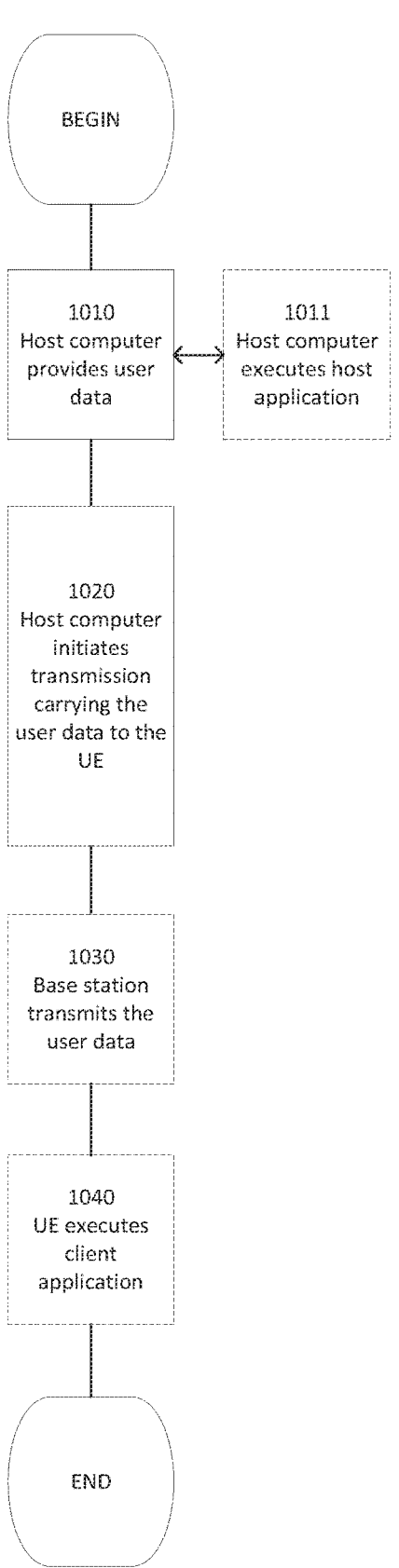
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 10 and FIG. 11. For simplicity of the present disclosure, only drawing references to FIG. 12 will be included in this section. In step 1010, the host computer provides user data. In substep 1011 (which may be optional) of step 1010, the host computer provides the user data by executing a host application. In step 1020, the host computer initiates a transmission carrying the user data to the UE. In step 1030 (which may be optional), the base station transmits to the UE the user data which was carried in the transmission that the host computer initiated, in accordance with the teachings of the embodiments described throughout this disclosure. In step 1040 (which may also be optional), the UE executes a client application associated with the host application executed by the host computer.

Figure 13:
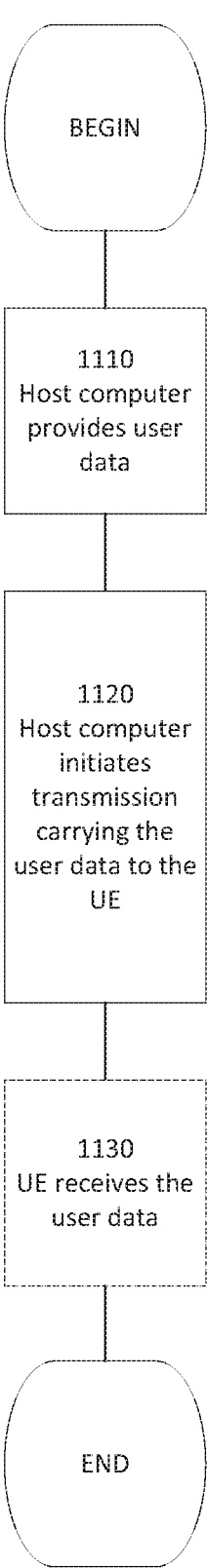
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 10 and FIG. 11. For simplicity of the present disclosure, only drawing references to FIG. 13 will be included in this section. In step 1110 of the method, the host computer provides user data. In an optional substep (not shown) the host computer provides the user data by executing a host application. In step 1120, the host computer initiates a transmission carrying the user data to the UE. The transmission may pass via the base station, in accordance with the teachings of the embodiments described throughout this disclosure. In step 1130 (which may be optional), the UE receives the user data carried in the transmission.

Figure 14:
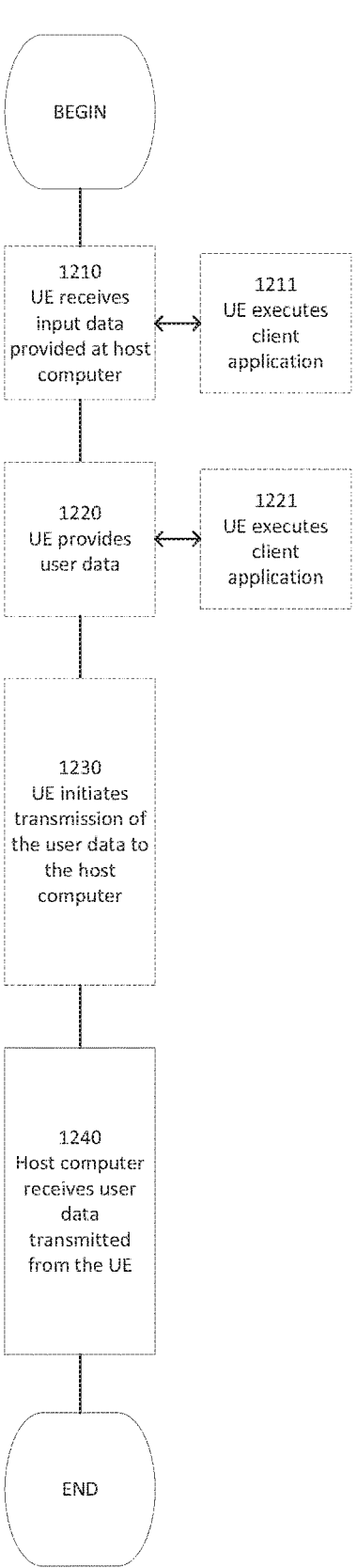
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 10 and FIG. 11. For simplicity of the present disclosure, only drawing references to FIG. 14 will be included in this section. In step 1210 (which may be optional), the UE receives input data provided by the host computer. Additionally or alternatively, in step 1220, the UE provides user data. In substep 1221 (which may be optional) of step 1220, the UE provides the user data by executing a client application. In substep 1211 (which may be optional) of step 1210, the UE executes a client application which provides the user data in reaction to the received input data provided by the host computer. In providing the user data, the executed client application may further consider user input received from the user. Regardless of the specific manner in which the user data was provided, the UE initiates, in substep 1230 (which may be optional), transmission of the user data to the host computer. In step 1240 of the method, the host computer receives the user data transmitted from the UE, in accordance with the teachings of the embodiments described throughout this disclosure.

Figure 15:
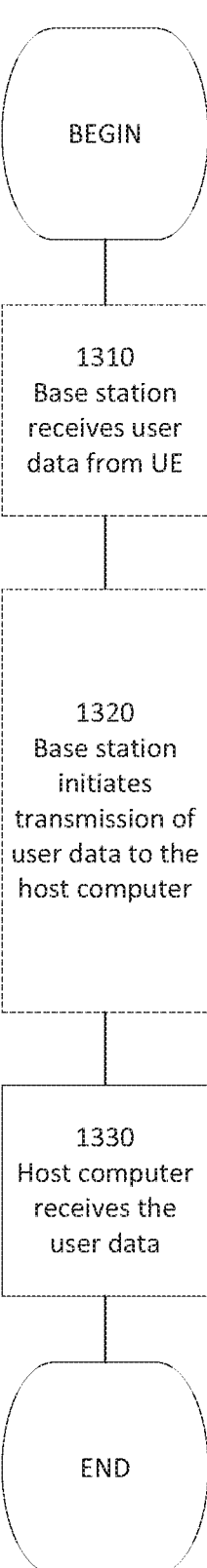
FIG. 15 is a flowchart illustrating a method implemented in a communication system, in accordance with an embodiment of the present disclosure.

FIG. 15 is a flowchart illustrating a method implemented in a communication system, in accordance with an embodiment. The communication system includes a host computer, a base station and a UE which may be those described with reference to FIG. 10 and FIG. 11. For simplicity of the present disclosure, only drawing references to FIG. 15 will be included in this section. In step 1310 (which may be optional), in accordance with the teachings of the embodiments described throughout this disclosure, the base station receives user data from the UE. In step 1320 (which may be optional), the base station initiates transmission of the received user data to the host computer. In step 1330 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method in a wireless communication device, comprising:
   determining if a timing advance command received in a media access control (MAC) control element is an absolute timing advance command; and determining, when it is determined that the timing advance command is an absolute timing advance command, a timing advance based on all bits of the timing advance command;

wherein a size of the timing advance command is 12 bits;

wherein determining a timing advance based on all bits of the timing advance command comprises:

determining a first timing advance from 7 most significant bits in 12 bits of the timing advance command;

determining a second timing advance from 5 least significant bits in the 12 bits of the timing advance command; and determining the timing advance in a same way as a normal timing advance command, by taking the first timing advance as an old timing advance and taking the second timing advance as an adjustment of timing advance.

2. The method according to claim 1, wherein, the first timing advance is calculated as a value of the 7 most significant bits multiplied with 32; and the second timing advance is calculated as a value of the 5 least significant bits plus 31.

3. The method according to claim 1, wherein, the normal timing advance command is a timing advance command received in a timing advance command MAC control element.

4. The method according to claim 1, wherein determining if the timing advance command received in the MAC control element is an absolute timing advance command comprises:

determining if the timing advance command received in the MAC control element is an absolute timing advance command according to a logical identifier of the timing advance command.

5. The method according to claim 1, further comprising:

receiving the timing advance command from a network node, in an absolute timing advance command MAC control element.

6. The method according to claim 1, further comprising:

applying the determined timing advance in an uplink communication from the wireless communication device to a network node.

7. The method according to claim 1, wherein the wireless communication device comprises a user equipment, UE.

8. An apparatus configured to operate as a wireless communication device, the apparatus comprising:

one or more processors; and one or more memories comprising computer program codes, the one or more memories and the computer program codes configured to, with the one or more processors, cause the apparatus to:

determine if a timing advance command received in a media access control (MAC) control element is an absolute timing advance command; and determine, when it is determined that the timing advance command is an absolute timing advance command, a timing advance based on all bits of the timing advance command;

wherein a size of the timing advance command is 12 bits;

wherein determining a timing advance based on all bits of the timing advance command comprises the one or more memories and the computer program codes configured to, with the one or more processors, cause the apparatus to:

determine a first timing advance from 7 most significant bits in 12 bits of the timing advance command;

determine a second timing advance from 5 least significant bits in the 12 bits of the timing advance command; and determine the timing advance in a same way as a normal timing advance command, by taking the first timing advance as an old timing advance and taking the second timing advance as an adjustment of timing advance.

9. The apparatus according to claim 8, wherein, the first timing advance is calculated as a value of the 7 most significant bits multiplied with 32; and the second timing advance is calculated as a value of the 5 least significant bits plus 31.

10. The apparatus according to claim 9, wherein, the normal timing advance command is a timing advance command received in a timing advance command MAC control element.

11. The apparatus according to claim 8, wherein determining if the timing advance command received in the MAC control element is an absolute timing advance command comprises:

determining if the timing advance command received in the MAC control element is an absolute timing advance command according to a logical identifier of the timing advance command.

12. The apparatus according to claim 8, further comprising:

receiving the timing advance command from a network node, in an absolute timing advance command MAC control element.

13. The apparatus according to claim 8, further comprising:

applying the determined timing advance in an uplink communication from the wireless communication device to a network node.

14. A non-transitory computer-readable medium having computer program codes embodied thereon which, when executed on a computer, cause the computer to:

determine if a timing advance command received in a media access control (MAC) control element is an absolute timing advance command; and determine, when it is determined that the timing advance command is an absolute timing advance command, a timing advance based on all bits of the timing advance command;

wherein a size of the timing advance command is 12 bits;

wherein determining a timing advance based on all bits of the timing advance command comprises the program codes to further cause the computer to:

determine a first timing advance from 7 most significant bits in 12 bits of the timing advance command;

determine a second timing advance from 5 least significant bits in the 12 bits of the timing advance command; and determine the timing advance in a same way as a normal timing advance command, by taking the first timing advance as an old timing advance and taking the second timing advance as an adjustment of timing advance.

* * * * *